United States Patent
Bofill

(10) Patent No.: US 10,798,915 B2
(45) Date of Patent: Oct. 13, 2020

(54) INSECT RESISTANT SUPPORT

(71) Applicant: Peter Bofill, Opa Locka, FL (US)

(72) Inventor: Peter Bofill, Opa Locka, FL (US)

( * ) Notice: Subject to any disclaimer, the term of this patent is extended or adjusted under 35 U.S.C. 154(b) by 0 days.

(21) Appl. No.: 16/114,105

(22) Filed: Aug. 27, 2018

(65) Prior Publication Data

US 2020/0060227 A1    Feb. 27, 2020

(51) Int. Cl.
*A01K 5/01* (2006.01)
*A01M 29/34* (2011.01)

(52) U.S. Cl.
CPC ........... *A01K 5/0142* (2013.01); *A01M 29/34* (2013.01)

(58) Field of Classification Search
CPC ........ A01K 5/0142; A01K 5/01; A01M 29/34
See application file for complete search history.

(56) References Cited

U.S. PATENT DOCUMENTS

| | | | | |
|---|---|---|---|---|
| 4,953,506 A | * | 9/1990 | Sanders | A01K 5/0142 119/61.53 |
| 5,109,800 A | * | 5/1992 | Williams | A01K 5/0142 119/61.53 |
| 6,059,243 A | * | 5/2000 | Hikage | B60N 3/102 248/311.2 |
| 2008/0011236 A1 | * | 1/2008 | Paez | A01K 5/0142 119/61.53 |
| 2012/0153113 A1 | * | 6/2012 | Voigt | B60N 3/101 248/316.7 |

* cited by examiner

*Primary Examiner* — Jessica B Wong
(74) *Attorney, Agent, or Firm* — Christopher J. VanDam, PA; Chris Vandam

(57) ABSTRACT

An insect resistant platform with a base assembly having a plurality of vertical posts on an upper surface that support the bottom side of a cover assembly. A sticky pad is on the upper surface of the base assembly with apertures that surround each of the posts. There is a gap between the base assembly and the cover assembly except at the posts. Any crawling insect will become captured by the sticky pad before being able to climb the posts heading toward the cover assembly. The top of the cover assembly is adapted to support an item such as a pet food bowl.

4 Claims, 3 Drawing Sheets

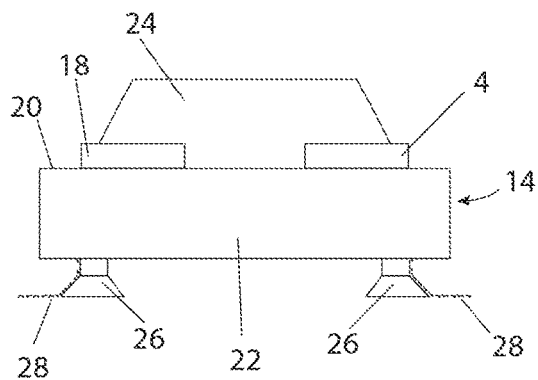
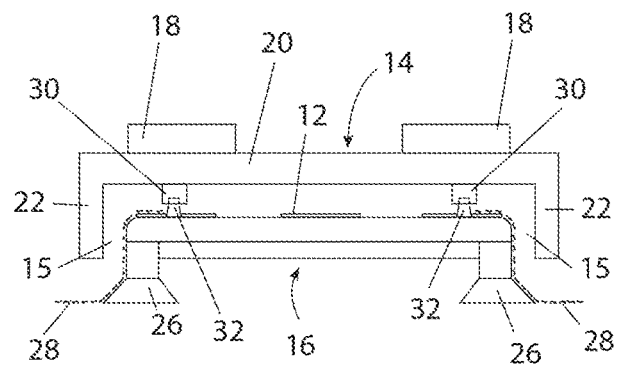
FIG. 1
FIG. 2
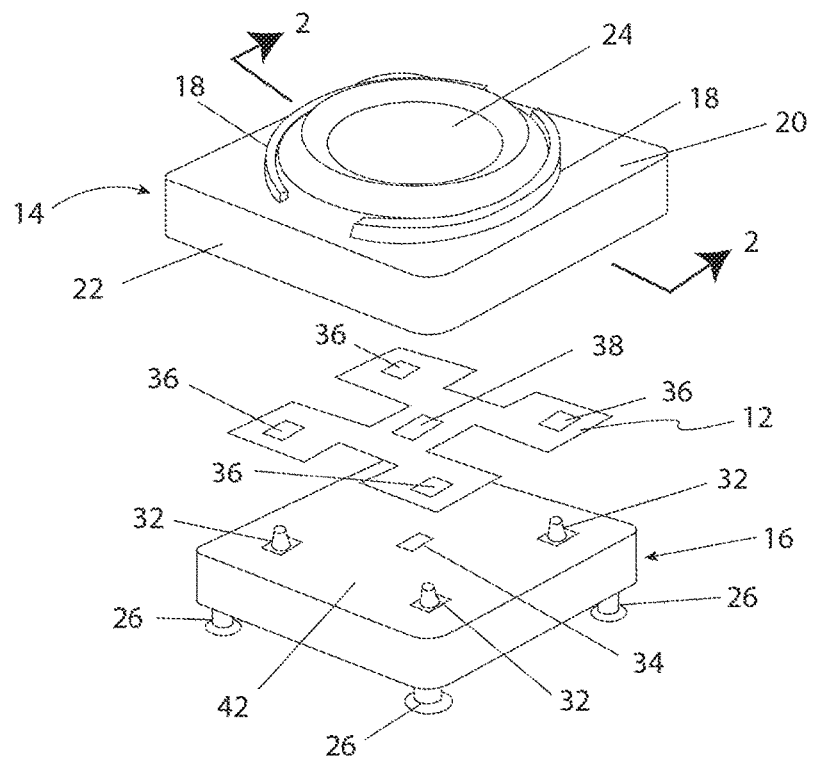
FIG. 3

INSECT RESISTANT SUPPORT

BACKGROUND OF THE INVENTION

1. Field of the Invention

The present invention relates to pest control means, and more particularly, to a platform support for pet food containers and other items that prevents insects from accessing the top of the support.

2. Description of the Related Art

Several designs for insect resistant pet food bowls have been designed in the past. None of them, however, includes a top surface isolated from the ground contacting base that blocks any path between the ground onto which the support is placed and the upper surface where the pet food (or other things) are placed or dispensed.

Applicant believes that the closest reference corresponds to a commercially available dog food bowl claiming to resist insects. However, it differs from the present invention because that prior art uses a moat or ring of water around the food bowl. This moat is open to access by the animal which can cause spills and the animal may try to consume the water.

The water has a tendency to evaporate and when gone is completely ineffective at stopping any insects on the surrounding floor from getting into the food in the associated bowl. Even if the water doesn't evaporate it creates a maintenance nuisance for the pet owner to constantly refill the ring of water and most likely clean up spilled water that escaped when the bowl is jostled by the feeding animal.

Some versions of the water barrier also include a substance in the water to repel ants, roaches and other insects that try to pass the water into the food. These can be repellents, poisons, soaps or other formulations that although purported to not be unhealthy for animals, are often not adequately tested nor are the ingredients disclosed to the pet owner and may cause untold harm to pets.

These chemicals can also affect animals that are not the intended feeders at the bowl. For example, cats may sometimes investigate around a dog's food bowl and could encounter the liquid in the ring exsposing them to some health risk.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main objects of the present invention to provide a safe means to prevent insects and other bugs from accessing a dog food bowl or other container.

It is another object of this invention to provide a surface that isolates the contents from access to any crawling bug to keep a container on the surface unadulterated.

Another object of the present invention is to trap insects near pet food without exposing the animals to toxic chemicals.

Another object of the present invention is to provide an insect trap that cannot spill water or chemicals if jostled and does not require maintenance by refilling liquid supplies.

It is still another object of the present invention to provide a pet food support that catches insects where when captured they cannot be seen and cannot be accessed by a pet.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 shows an elevation view of an insect resistant support.

FIG. 2 shows an elevation cross-section view of an insect resistant support from the perspective identified in FIG. 3.

FIG. 3 shows an exploded perspective view of an insect resistant support.

DETAILED DESCRIPTION OF THE PREFERRED EMBODIMENT

Figure 4:
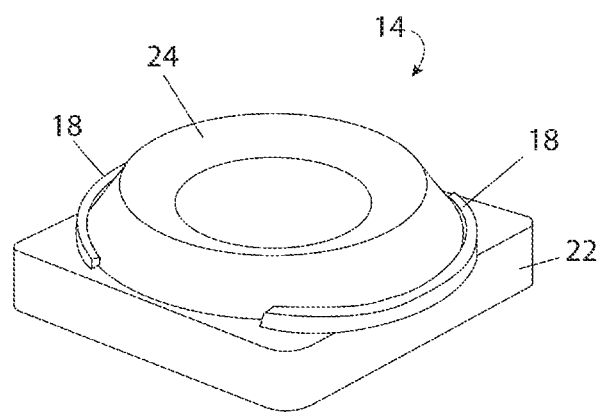
FIG. 4 shows a perspective view of a cover assembly of an insect resistant support.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the insect resistant support, the support, the platform, the pet food holder, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a pad 12, a cover assembly 14, a gap 15, a base assembly 16, a ring 18, a top 20, a skirt 22, a bowl 24, legs 26, insects 28, sockets 30, posts 32, a well 34, apertures 36, an aperture 38, an edge 40, a surface 42, a tab 44, a track 45, a base assembly 46, a cover assembly 48, a pad 50, apertures 52, a perimeter 54, posts 56, a water dispenser assembly 58, a gap 60, apertures 62, a perimeter 64 and a pad 66.

FIG. 1 shows an elevation view of an assembly insect resistant support that has been adapted for use with a pet food container. The bowl 24 on the top 20 of the cover assembly may hold, for example, pet food or water. The ring 18, optionally present, holds the bowl 24 on top of the surface 20 even when bumped about by a feeding animal.

Generally, the ring 18 may be circular in shape to hold a circular bowl 24 on the top 20. Even if the ring 18 is circular it may still hold other shaped bowls, such as rectangular, square or other shapes that fit within the boundaries of the ring 18.

Looking at FIG. 2, where a cross-section elevation view is show, the internal components of the support are readily visible. The support is generally comprise of two primary elements: the base assembly 16 and the cover assembly 14. The base assembly 16 has a plurality of posts 32 rising above the surface 42 that interface with the sockets 30 that are integral to the underside of the top 20.

The points where the sockets 30 contact the posts 32 are the only places where the cover assembly 14 touches the base assembly 18. A gap 15 completely separates the cover assembly 14 and base assembly 18 so that any insect 28 traversing from the base assembly 18 to the cover assembly 14 must theoretically pass over a post 32 and socket 30.

However, the insects 28 will never be able to get to the posts 32 and associated sockets 30 because they will have to pass over the pad 12, as seen in FIG. 3. The pad 12 has a series of apertures 36 that match the positions of the posts 32 on the surface 42. The pad 12 lays on the surface 42 with the posts 32 protruding through the pad 12.

The pad 12 is covered with a sticky substance that will capture any insect 28 that touches it. Since the insects 28 would have to cross on top of the pad 12 they will all instantly become irreparably stuck to the surface of the pad. Anywhere the insect 28 touch the top of the pad 12 they will become instantly stuck and thus will be unable to continue on to reach the posts 32 and can never get to the cover assembly 14 where the food bowl 24 is located.

The sticky on top of the pad 12 should not be able dry out over the course of a normal use that may be weeks to months before the pad and the connected sticky would need to be replaced. The pad 12 generally is replaced when it has a substantial amount of insects adhered to the surface, after a present duration of time, or when the sticky surface is no longer effective at holding the old and new insects permanently onto the surface of the pad 14.

The pad 12 may itself be lightly adhered to the surface 42 of the base assembly 16 so that it is not displaced during use. The pad 12 should be readily detachable by the user so that a used pad 12 with insects adhered may be replaced with a fresh pad 12. New pads 12 may be supplied and replaced when needed.

The pad 12 may have a paper, plastic, cardstock or other such semi-rigid backing material onto which the sticky material is attached. This may obviate the need to adhere the bottom of the pad 12 to the surface 42 as it would simply lay flat on the surface 42. The pad 12 will stay perfectly aligned onto the surface 42 because the posts 32 pierce through the apertures 36.

Optionally, the pad 12 also has an aperture 38 aligned over a well 34 formed into the surface 42. The well 34 is an indentation that can hold a substance such as an attractant, bait or substance toxic to the insects 28 targeted by the device. The well 34 is exposed through the aperture in the pad 14. The insects 28 may not be able to access the well 34 because they would have to pass over the pad 12 that is covered with an impassable, sticky surface.

The skirt 22 surrounds the perimeter of the cover assembly to prevent access to the pad 12 by the feeding pet or other persons or objects. The skirt 22 still retains a gap 15 so that no insects can climb from the base assembly 16 or the underlying surface directly onto the cover assembly 14 where the insects could access the bowl 24 or other object placed on the top 20 of the cover assembly 14. The gap 15 and skirt 22 are entirely around the perimeter between the cover assembly 14 and the base assembly 16 preventing all insects from getting on the top side of the cover assembly 14 and getting access to the bowl 24.

The tops of the posts 32 may interface positively with the sockets 30 so that the top assembly 14 connects with the bottom assembly 16. There may be a snap together connection where the posts 32 snap into and frictionally engage the sockets 30 on the cover assembly 14. The connection may be magnetic or other types of snaps or clips to prevent the cover assembly 14 from disengaging from the base assembly 16, for example when bumped by a feeding pet to avoid an unwanted exposure of the pad 12 with its adhered insects to the pet.

Of course the cover assembly 14 and base assembly 16 must be easily separable by the human user so that the device may be periodically cleaned and a fresh adhesive pad 12 can be installed on the surface 42 between the cover assembly 14 and base assembly 16. Generally, a firm human tug apart should be approximately be the amount of force sufficient to separate these assemblies.

Looking at FIG. 4, a perspective view of a version of the support is shown to include a larger bowl 24. The cover assembly 14 is dimensioned, along with the dimensions of the associated ring 18, to fit that bowl 24. Similarly, the scale and dimensions of the cover assembly 14 itself can be adapted to any selected bowl 24. The bowl 24 may take other shapes than round as seen in FIG. 4. A square, rectangular or double bowl for food and water simultaneously may also be used.

The ring 18 may be adapted to the specific bowl or simply may be absent. Other features can substitute for the ring 18. For example, the top 20 may have a grippy surface. Additionally or alternatively the top 20 may have grooves or indentations for a particular bowl. Posts, clips, snaps or other means to attach a bowl to the surface 20 of the cover assembly 14 may also be employed to retain the bowl 24 in position on top of the cover assembly 14.

Figure 5:
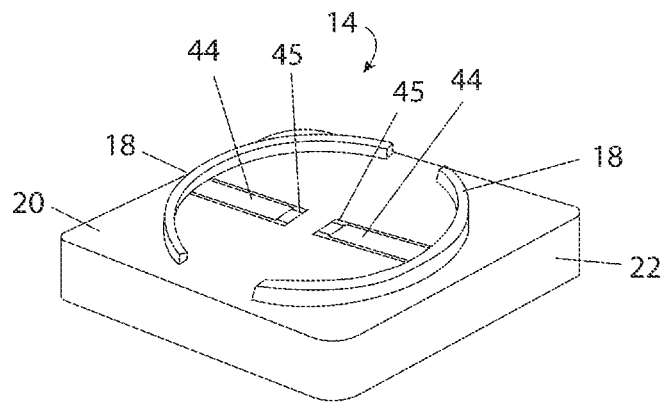
FIG. 5 shows a perspective view of a cover assembly of an insect resistant support.

FIG. 5 shows an optional feature included on the cover assembly 14 to adjust the space between segments of the ring 18. Each part of the ring 18 has a tab 44 on a lower side that engages into a track 45. The tab 44 and the connected segment of ring 18 can slide in the track 45 to create a larger interior of the ring 18 to snugly fit a wide variety and dimensions of bowls 24 or other articles on top of the top 20.

The tabs 44 may functionally engage into the tracks 45. Alternatively, other means to affix the tabs 44 into the tracks 45 may be used such as a friction fit, magnets, snaps, clips, engaging saw-tooth surfaces or other similar means. In at least one version the tabs 44 may be permanently adhered by the end user to fit a specific bowl 24 or other object held onto the insect resistant surface.

Figure 6:
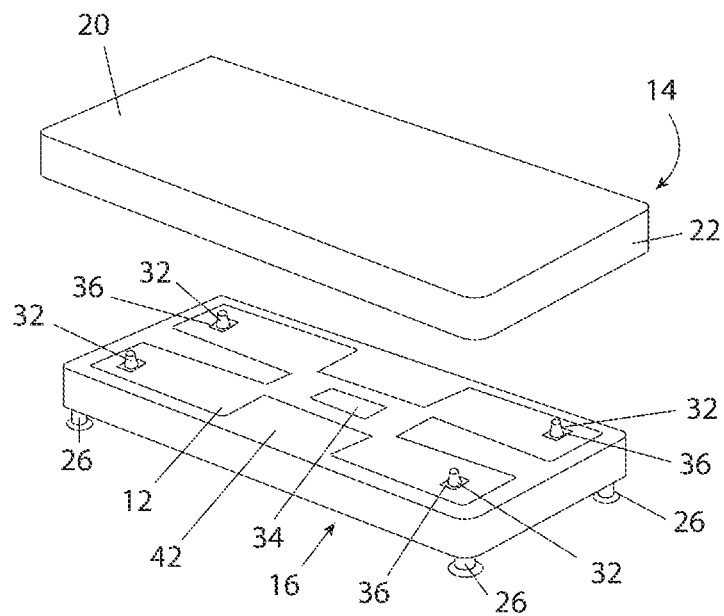
FIG. 6 shows an exploded perspective view of an insect resistant support.

FIG. 6 shows another configuration of an insect resistant surface. Many of the parts of the embodiments described above are analogous to those in this version. This example is shown to demonstrate that the dimensions of the cover assembly 14 and base assembly 16 may be adapted to fit a variety of other articles. For example, a wider overall size could be used for double dishes to hold both food and water for a pet. Of course other things could be placed upon the insect resistant surface other than pet food. Anything that a user wants to put on the surface to isolate from itinerant insects could be effectively places on the top 20. For example, food in a cupboard would be suitable for any of the designs for an insect resistant surface included herein.

Figure 7:
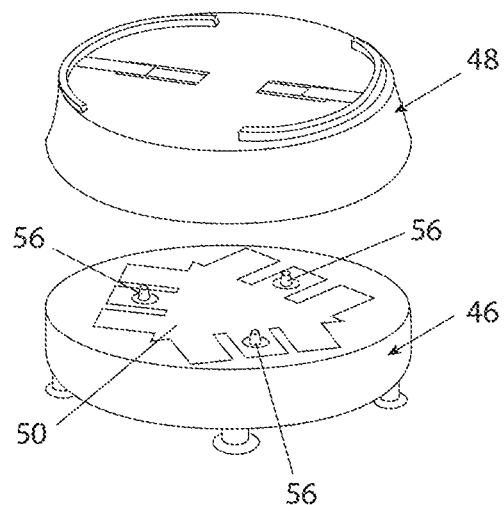
FIG. 7 shows an exploded perspective view of an insect resistant support.

FIG. 7 is yet another effective configuration of an insect resistant support. The overall round profile may be desirable for some users. Notice that fewer posts 56 may be used to support the cover assembly 48. The pad 47 will have a corresponding number of apertures 52 as the number of posts 56. Like other configurations, any insects cannot get to the posts 56, the only path to the cover assembly 48 without hopelessly getting caught in the sticky surface of the pad 47. The perimeter 54 must be outside the footprint occupied by the posts 56.

Figure 8:
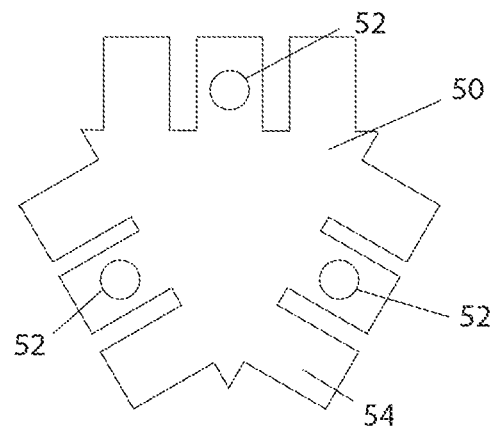
FIG. 8 shows a plan view of a pad for an insect resistant support.

FIG. 8 is an example of an alternate configuration of a pad 66. This example demonstrates the concept that a larger perimeter 64 may be advantageous because it provides a longer line which an insect can first encounter the pad 66 and become stuck on its sticky surface. In most cases of an insect coming into contact with the pad 66 it will get stuck immediately at the edge defined by the perimeter 64.

The longer the perimeter 64 the more insects can be caught at that perimeter 64. As in other versions and configurations of the pads herein the apertures 62 through which the posts pass through must be within the perimeter 64 so that the insects must pass over at least some of the sticky on the pad 66 from which they will not be able to escape.

Figure 9:
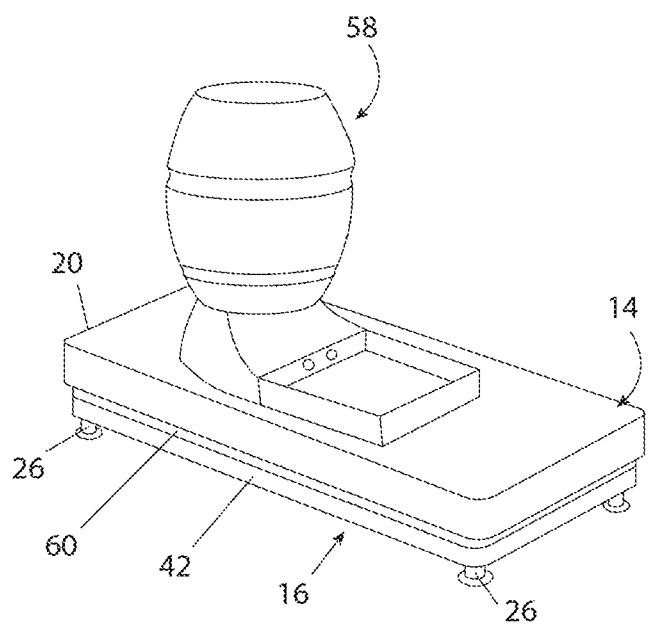
FIG. 9 shows a perspective view of an insect resistant support holding a water dispenser assembly.

FIG. 9 shows another exemplary use of the insect resistant support including a water dispenser assembly 58. Water attracts many insects so this use is particularly beneficial. Like the other versions there is an air gap 60 between the base assembly 16 and the cover assembly 14 that cannot be jumped by insects. A sticky pad must be encountered by any insect attempting to crawl from the ground to the top 20.

A version of the invention can be fairly described as an insect resistant support comprised of a base assembly and a cover assembly. The base assembly has a bottom side and an upper surface. The upper surface of the base assembly has a plurality of posts extending perpendicular from the upper surface. The bottom side of the base assembly is ground contacting. The cover assembly has a bottom side and an upper surface. The upper surface of the cover assembly is adapted to support a preselected object, for example a pet food bowl or a water dispenser. The bottom side of the cover assembly has a plurality of sockets equal in number to the posts on the upper surface of the base assembly. The posts are each positioned to contact and support a single socket so that there is a gap completely between the base assembly and the cover assembly except where the posts contact the sockets. There could optionally be a single post supporting the entire cover assembly where the single post is encircled by the sticky pad preventing any access to the cover assembly. The gap is sufficient so that a predetermined crawling insect is unable to crawl directly from the base assembly to the cover assembly except for at the posts. A pad is positioned on the upper surface of the base. The pad has an aperture that each post passes through so that each post is entirely encircled by the pad. The upper surface of the pad is covered in a sticky material. A skirt encircles a perimeter edge of the cover assembly to conceal the gap between the cover assembly and the base assembly. Optionally, the upper surface of the cover surface includes a ring adapted to retain a preselected bowl, for example of pet food or water. Optionally, ring is adjustable to a preselected range of diameters by spreading on tracks. Optionally, the pad includes an elongated perimeter in a circuitous pathway around the outside of the posts to extend the length that a crawling insect first encounters when traversing from the base assembly towards the cover assembly.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An insect resistant support comprised of a base assembly and a cover assembly;
   the base assembly has a bottom side and an upper surface;
   the entire upper surface of the base assembly is planar and has a plurality of posts extending perpendicular from the upper surface;
   the bottom side of the base assembly is configured to be ground contacting;
   the cover assembly has a bottom side and an upper surface;
   the upper surface of the cover assembly supports a preselected object placed on the upper surface of the cover assembly;
   the bottom side of the cover assembly has a plurality of sockets equal in number to the posts on the upper surface of the base assembly;
   the posts are each positioned to contact and support a single socket so that there is a gap completely between the base assembly and the cover assembly except where the posts contact the sockets;
   the gap is sufficient so that a predetermined crawling insect is unable to crawl directly from the base assembly to the cover assembly, except for at the posts;
   a pad is positioned on the upper surface of the base;
   the pad is triangular in shape with three arms extending outwardly, in a perpendicular direction from three sides of the triangle, the three arms of the pad extend toward outer edges of the base;
   each post passes through an individual aperture in the pad so that each post is entirely encircled by the pad;
   the upper surface of the pad is covered in a sticky material which prevents insects from reaching the cover where the preselected object is located; and
   a skirt encircles a perimeter edge of the cover assembly to conceal the gap between the cover assembly and the base assembly.

2. The insect resistant support of claim 1 further characterized in that the upper surface of the cover assembly includes a ring adapted to retain the preselected object; and the preselected object is a bowl.

3. The insect resistant support of claim 2 further characterized in that a diameter of the ring is adjustable along a track within a preselected range of diameters.

4. An insect resistant support comprised of a base assembly and a cover assembly;
the base assembly has a bottom side and an upper surface;
the entire upper surface of the base assembly is planar and has a plurality of posts extending perpendicular from the upper surface;
the bottom side of the base assembly is configured to be ground contacting;
the cover assembly has a bottom side and an upper surface;
the upper surface of the cover assembly supports a preselected object placed on the upper surface of the cover assembly;
the bottom side of the cover assembly has a plurality of sockets equal in number to the posts on the upper surface of the base assembly;
the posts are each positioned to contact and support a single socket so that there is a gap completely between the base assembly and the cover assembly except where the posts contact the sockets;
the gap is sufficient so that a predetermined crawling insect is unable to crawl directly from the base assembly to the cover assembly, except for at the posts;
a pad is positioned on the upper surface of the base;
the pad is formed as five rectangles with four at outer corners of the pad and a central rectangle, two outer sides of each of the outer rectangles extend adjacent to the outer corners of the base, and the central rectangle connects with each of the of the outer rectangles,
each post passes through an individual aperture in the pad so that each post is entirely encircled by the pad;
the upper surface of the pad is covered in a sticky material which prevents insects from reaching the cover where the preselected object is located; and
a skirt encircles a perimeter edge of the cover assembly to conceal the gap between the cover assembly and the base assembly.

* * * * *